United States Patent [19]

Butz

[11] Patent Number: 4,567,973
[45] Date of Patent: Feb. 4, 1986

[54] FREEWHEEL DRIVE HUB FOR A BICYCLE

[75] Inventor: Hans Butz, Schwebheim, Fed. Rep. of Germany

[73] Assignee: Fichtel & Sachs AG, Schweinfurt, Fed. Rep. of Germany

[21] Appl. No.: 646,632

[22] Filed: Aug. 31, 1984

[30] Foreign Application Priority Data

Sep. 1, 1983 [DE] Fed. Rep. of Germany ....... 3331557

[51] Int. Cl.[4] .................... F16D 41/30; B60B 27/02; F16J 15/32
[52] U.S. Cl. .................... 192/64; 301/105 B; 277/212 FB
[58] Field of Search ............. 192/46, 64; 301/105 B; 277/9, 9.5, 11, 212 FB

[56] References Cited

U.S. PATENT DOCUMENTS

| 2,568,834 | 9/1951 | Streifthan | 301/105 B |
| 3,082,042 | 3/1963 | Liebreich | 301/105 B |
| 3,596,915 | 8/1971 | Snidar | 277/212 FB |
| 3,922,018 | 11/1975 | Shook | 301/105 B |
| 4,456,269 | 6/1984 | Krude et al. | 277/212 FB |

FOREIGN PATENT DOCUMENTS

| 1155355 | 4/1964 | Fed. Rep. of Germany . | |
| G8226103 | 12/1982 | Fed. Rep. of Germany . | |
| 997737 | 9/1951 | France . | |
| 249896 | 8/1926 | Italy | 192/64 |
| 498901 | 11/1954 | Italy | 192/64 |
| 26398 | of 1899 | United Kingdom | 192/64 |
| 445759 | 4/1936 | United Kingdom | 192/64 |
| 461951 | 2/1937 | United Kingdom | 192/64 |
| 498936 | 1/1939 | United Kingdom | 192/64 |
| 572237 | 9/1945 | United Kingdom | 192/64 |

Primary Examiner—Rodney H. Bonck
Assistant Examiner—Richard M. Lorence
Attorney, Agent, or Firm—Toren, McGeady, Stanger, Goldberg & Kiel

[57] ABSTRACT

The freewheel drive hub for a bicycle comprises a hub spindle consisting of two spindle parts axially disengageably coupled with one another. On a first of the two spindle parts, which is individually securable on the frame of the bicycle, a drive member is rotatably mounted, carrying at least one chain wheel. A hub sleeve is rotatably mounted on the second spindle part. A pawl freewheel with radial pawls pivotably mounted on the hub sleeve couples the drive member with the hub sleeve. A distance ring is loosely seated on the second spindle part on the side axially remote from the drive member. The distance ring carries an axially movable ring part which facilitates the handling of the distance ring and in the insertion of the second spindle part centers the distance ring on the hub sleeve.

6 Claims, 5 Drawing Figures

FREEWHEEL DRIVE HUB FOR A BICYCLE

BACKGROUND OF THE INVENTION

The invention relates to a freewheel drive hub for a bicycle and especially a freewheel hub the hub sleeve of which is coupled with a drive member carrying at least one chain wheel, in such a way as to be removable in practical use.

STATEMENT OF PRIOR ART

From German Utility Model No. 82 26 103 a freewheel drive hub for a bicycle is known, the hub sleeve of which is disengageably coupled through a pawl freewheel with a drive member carrying a plurality of chain wheels. The drive member is mounted rotatably on a first spindle part and can be secured by means of this spindle part as an independent unit on the frame of the bicycle. The hub sleeve is mounted rotatably on a second spindle part by means of two ball bearings. The second spindle part can be inserted into the hub sleeve from the side axially remote from the drive member and can be screwed to the first spindle part. The freewheel coupling comprises pawls mounted pivotably on the hub sleeve and engaging in a pawl toothing of the drive member. In order that the hub sleeve may be disengaged from the drive member retained on the bicycle frame, it must be moved axially away from the drive member. In the installed condition a distance ring prevents this axial displacement. The distance ring is seated, on the side axially remote from the drive member, loosely on the second spindle part between the inner race ring of the ball bearing and the bicycle frame.

In the known freewheel drive hub the external diameter of the distance ring is made approximately equal to the external diameter of the inner race ring of the ball bearing. When the hub sleeve is mounted on the drive member, already retained on the bicycle frame, the distance ring must be threaded on to the second spindle part in the relatively narrow gap between hub sleeve and bicycle frame. This is relatively time-consuming.

OBJECT OF THE INVENTION

An object of the invention is to improve the distance ring of the freewheel drive hub so that it can be fitted more easily.

SUMMARY OF THE INVENTION

According to the invention, there is provided a freewheel drive hub for a bicycle, comprising a hub spindle having two spindle parts axially disengageably coupled with one another. On a first of the two spindle parts, which is individually securable to the bicycle, a drive member carrying at least one chain wheel is rotatably mounted. On the second of the two spindle parts a hub sleeve is rotatably mounted. Within a sleeve extension piece, coaxial with the second spindle part and protruding axially from the side of the hub sleeve remote from the drive member, a rolling bearing is provided. In the torque transmission path between the drive member and the hub sleeve a freewheel coupling is arranged. On the side axially remote from the drive member a loose distance ring surrounding the second spindle part rests on the inner race ring of the rolling bearing. The distance ring carries a ring part having an annular extension piece axially overlapping the sleeve extension piece on its radially outer side. At least the annular extension piece of the ring part is guided on the distance ring axially movably in relation to the distance ring between a position overlapping the sleeve extension piece and a position axially laterally of the sleeve extension piece.

The annular extension piece has an external diameter which is larger than the sleeve extension piece holding the adjacent rolling bearing of the hub sleeve, and can be introduced without problem into the axial gap between the hub sleeve and the bicycle frame. In the introduction and removal of the distance ring the annular extension piece is situated in its position axially laterally of the sleeve extension piece. Before the second spindle part is inserted into the hub sleeve, the annular extension piece can be shifted into its position overlapping the sleeve extension piece. In this position the annular extension piece centres the distance ring on the hub sleeve, so that the second spindle part can be inserted without problem. In the position overlapped by the hub sleeve the ring part at the same time protects the adjacent rolling bearing against soiling.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
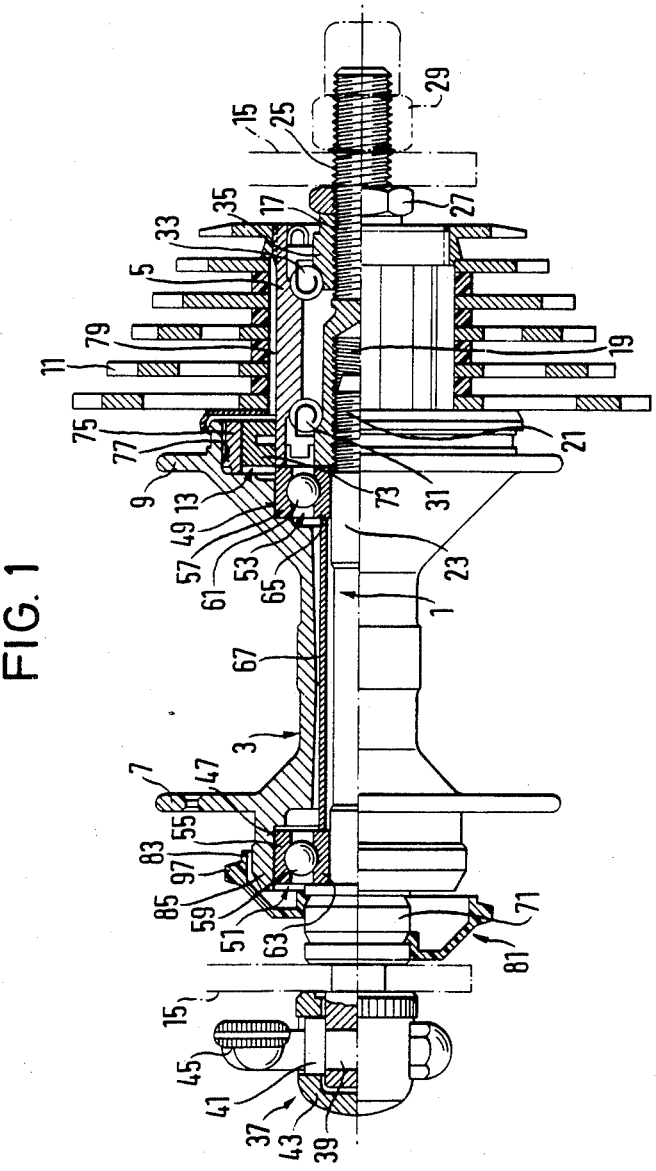
FIG. 1 shows in its upper half an axial longitudinal section through a freewheel drive hub of a bicycle and in its lower half a view of the drive hub.

The freewheel hub comprises a hub spindle designated generally by 1 on which a hub sleeve 3, and, axially beside the hub sleeve 3, a drive member 5 of sleeve form are rotatably mounted. The hub sleeve 3 carries two spoke flanges 7, 9 axially spaced from one another. Several chain wheels 11 are fixedly seated on the drive member 5. A pawl freewheel 13 couples the drive member 5 non-rotatably in one direction with the hub sleeve 3, while in the other direction it is freely rotatable in relation to the hub sleeve 3. The hub spindle 1 is secured to a rear wheel fork 15 of the bicycle.

The hub spindle 1 is made axially divisible and comprises a first spindle part 17 which has an axial threaded bore 19 at its one end into which a threaded extension piece 21 of a second spindle part 23 passing through the hub sleeve 3 is screwed. The spindle part 17 is provided at its end remote from the hub sleeve 3 with an external threading 25 and is mounted on the rear fork 15 by means of two nuts 27, 29. The drive member 5 is mounted on the spindle part 17 through two ball bearings 31, 33. The outer race tracks of the ball bearings 31, 33 are formed on the drive member 5. While the inner race ring of the ball bearing 31 is formed on the spindle part 17, the inner race ring of the ball bearing 33 is formed by an adjusting cone 35 which is screwed on to the threading 25 and locked by means of the nut 27.

The spindle part 23 can be inserted axially into the hub sleeve 3 from outside the rear wheel fork 15 and carries on its end remote from the spindle part 17 an eccentric tightening device 37 having an eccentric 39 rotatably mounted on the spindle part 23. The rotation axis of the eccentric 39 extends eccentrically in relation to cylindrical tightening flanges 41 which are mounted rotatably in a cap 43. The eccentric 39 and the thightening flanges 41 are connected integrally with a tightening lever 45 extending transversely of the eccentric 39. On pivoting of the tightening lever 45 the tightening cap 43 is displaced axially in relation to the spindle part 23.

In the region of its spoke flanges 7, 9 the hub sleeve carries a groove-type ball bearing 51 and 53 respectively in each of hollow cylindrical, axially outwardly open apertures 47 and 49. The groove-type ball bearing 51, 53 each comprise an outer bearing race ring 55 and 57, each of which fixes an inner bearing race ring 63 and 65 respectively, both axially and radially, by means of rolling bodies such as balls 59 and 61. The apertures 47, 49 of the hub sleeve 3 are provided with shoulders facing axially away from one another which determine the axial interval of the outer bearing race rings 55, 57. The axial interval of the inner bearing race rings 63, 65 is determined by a distance tube 67. On the side axially remote from the distance tube 67 the inner bearing race ring 65 rests against the facing end face of the spindle part 17. Between the inner bearing race ring 63 and the part of the rear fork 15 adjacent to the eccentric tightening device 37 a distance ring 71 is fitted on to the spindle part 23. The eccentric tightening device 37 thus tightens this part of the rear fork 15 through the distance ring 71, the inner bearing race ring 63, the distance tube 67 and the inner bearing race ring 65 against the spindle part 17 secured to the other part of the rear fork 15.

The pawl freewheel 13 comprises pawls 73 which are mounted at their radially outer end for pivoting about a rotation axis parallel to the hub spindle 1 in a bearing race ring 75 which coaxially encloses the drive member 5. The bearing ring 75 is held fast in a recess 77 of the hub sleeve 3 which axially adjoins the groove-type ball bearing 53. The pawls 73 engage with their radially inner ends in axial grooves 79 distributed on the external circumference of the drive member 5 and forming a pawl toothing of the pawl freewheel 13. Springs (not shown further) initially stress the pawls 73 radially inwards into the grooves 79. The grooves 79 extend over the entire axial length of the drive member 5 and at the same time nonrotatably secure the chain wheels 11 on the drive member 5.

Figure 2:
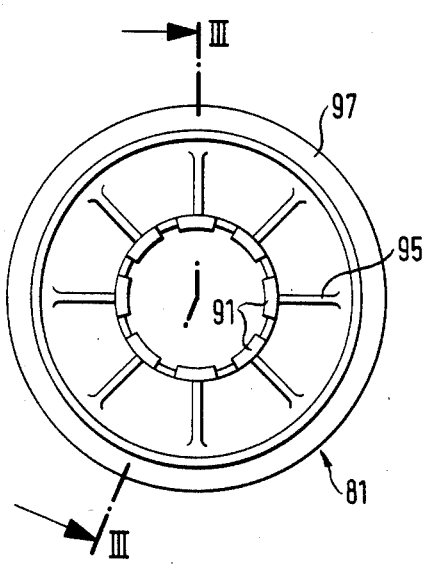
FIG. 2 shows a ring part of the drive hub according to FIG. 1.
Figure 3:
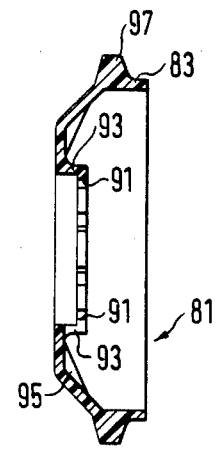
FIG. 3 shows a sectional view of the ring part, seen along a line III—III in FIG. 2.
Figure 4:
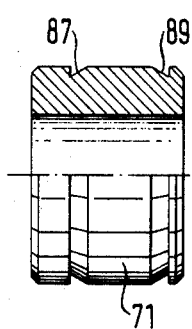
FIG. 4 shows a distance ring of the drive hub according to FIG. 1 for the axially displaceable guidance of the ring part according to FIG. 2.

The distance ring 71, represented individually in FIG. 4, carries a ring part 82 of cap form, represented individually in FIGS. 2 and 3. The ring part 81 has an annular extension piece 83 protruding axially towards the hub sleeve 3. The internal diameter of the extension piece 83 is somewhat greater than a sleeve extension piece 85 which protrudes from the hub sleeve 3 axially towards the distance ring 71 and forms the aperture 59 of the hub sleeve 3. The ring part 81 is axially displaceably guided on the distance ring 71 and can be detained on the distance ring 71 in two positions situated axially spaced from one another. In the first position, represented at the top in FIG. 1, the annular extension piece 83 overlaps the sleeve extension piece 85. In the position represented at the bottom in FIG. 1 the ring part 81, including the annular extension piece 83, extends axially laterally of the sleeve extension piece 85. The distance ring 71 carries, in conformity with the two positions, two annular grooves 87, 89 into which there can snap radially inwardly extending noses or resilient snap projections 91 arranged on the internal circumference of the ring part 81. The noses 91 are provided on the free ends of elastically resilient tabs 93 protruding axially from the ring part 81. The annular grooves 87, 89 are provided with entry slopes rising towards one another. The ring part 81 is stiffened by radial ribs 95 and carries a surrounding, stiffening grip bead or annular grip reinforcement 97 on the external circumference of the annular extension piece 83. The ring part 81 consists of a stiffly elastic material, especially synthetic plastics material.

For the removal of the hub body 3 the tightening lever 45 is pivoted out of the position as shown in FIG. 1, whereby the hub spindle 1 is released. The spindle part 23 is screwed out of the spindle part 17 and withdrawn axially. After the ring part 81 has been shifted out of the position represented at the top in FIG. 1 into the position represented at the bottom in FIG. 1, the distance ring 71 can be withdrawn together with the ring part 81. Thus the hub sleeve 3 can be withdrawn axially from the drive member 5 and taken out of the rear wheel fork 15. It is not necessary to release the fastening of the drive member 5.

The assembling of the freewheel drive hub takes place in the converse sequence. After the insertion of the hub sleeve 3 the distance ring is inserted between the sleeve extension piece 85 and the rear wheel fork 15. The ring part 81 is shifted out of the position represented below in FIG. 1 into the position represented at the top, in which the annular extension piece 83 axially overlaps the sleeve extension piece 85. In this position the ring part 81 centres the distance ring 71 in relation to the hub sleeve 3. Then the spindle part 23 can be introduced, screwed to the spindle part 17 and finally tightened, without problem.

Figure 5:
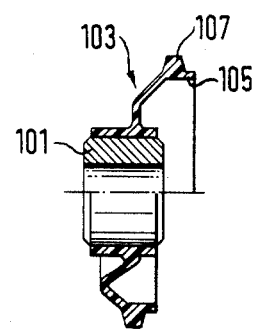
FIG. 5 shows a partially sectional view of another embodiment of a distance ring with fixedly seated ring part, usable in the freewheel drive hub according to FIG. 1.

FIG. 5 shows a variant of a distance ring 101 which can be used in place of the distance ring 71 in the drive hub according to FIG. 1. A ring part 103 of a rubberelastic material, corresponding in function to the ring part 81, is firmly connected with the distance ring 101. The ring part 103 has an annular extension piece 105 which in a first position overlaps the annular extension piece 85 on the axially external side and protects the ball bearing 51 against soiling. Since the ring part 103 consists of rubber-elastic material, as shown at the bottom of FIG. 5 it can be deflected flexibly into a position in which the distance ring 101 and the ring part 103 are situated axially laterally of the sleeve extension piece 85, and thus can be separated from the hub sleeve 3. Again a circumferential grip bead 107 which radially stiffens the annular extension piece 105 is provided on the external circumference of the annular extension piece 105. Similarly to the distance ring 71 and the ring part 81, the distance ring 101 and the ring part 103 form one separately handlable unit.

While specific embodiments of the invention have been shown and described in detail to illustrate the application of the inventive principles, it will be understood that the invention may be embodied otherwise without departing from such principles.

What is claimed is:

1. In a freewheel drive hub for a bicycle comprising
   (a) a hub spindle having two spindle parts axially disengageably coupled with one another, of which a first of the two spindle parts is individually securable to the bicycle,
   (b) a drive member rotatably mounted on the first spindle part and carrying at least one chain wheel,
   (c) a hub sleeve rotatably mounted on the second of the two spindle parts, having two spoke flanges, arranged with axial spacing from one another, and a sleeve extension coaxial with the second spindle part, said sleeve extension protruding axially from the side of the hub sleeve remote from the drive member,
   (d) a rolling bearing in the region of each of the spoke flanges, each of said bearings comprising an outer race ring held on the hub sleeve, an inner race ring seated on the second spindle part axially movable in relation thereto, and rolling bodies between the inner race ring and the outer race ring,
   (e) a freewheel coupling arranged in the torque transmission path between the drive member and the hub sleeve, comprising a pawl toothing concentric with the hub spindle and at least one pawl engaging under resilient initial stress in the pawl toothing,
   (f) a loose distance ring surrounding the second spindle part and resting on the inner race ring of the rolling bearing remote from the drive member on the axially remote side of the drive member,
   (g) a ring part carried on the distance ring and having an annular extension being axially movable in relation to the distance ring between a position in which said annular extension axially overlaps the sleeve extension on its radially outer side and a position axially laterally of the sleeve extension.

2. Freewheel drive hub according to claim 1, wherein the ring part consists of a rubber-elastic material and is firmly secured in the region of its internal circumference to the distance ring.

3. Freewheel drive hub according to claim 2, wherein the ring part is provided with an annular grip reinforcement along its external circumference.

4. Freewheel drive hub according to claim 1, wherein the ring part is axially displaceably guided on the distance ring.

5. Freewheel drive hub according to claim 4, wherein the distance ring comprises on its external circumferential surface two annular grooves with axial spacing from one another and wherein the ring part comprises several radially resilient snap projections distributed along its internal circumference to engage in the annular grooves.

6. Freewheel drive hub according to claim 4, wherein the ring part is provided with an annular grip reinforcement along its external circumference.

* * * * *